United States Patent Office 3,521,317
Patented July 21, 1970

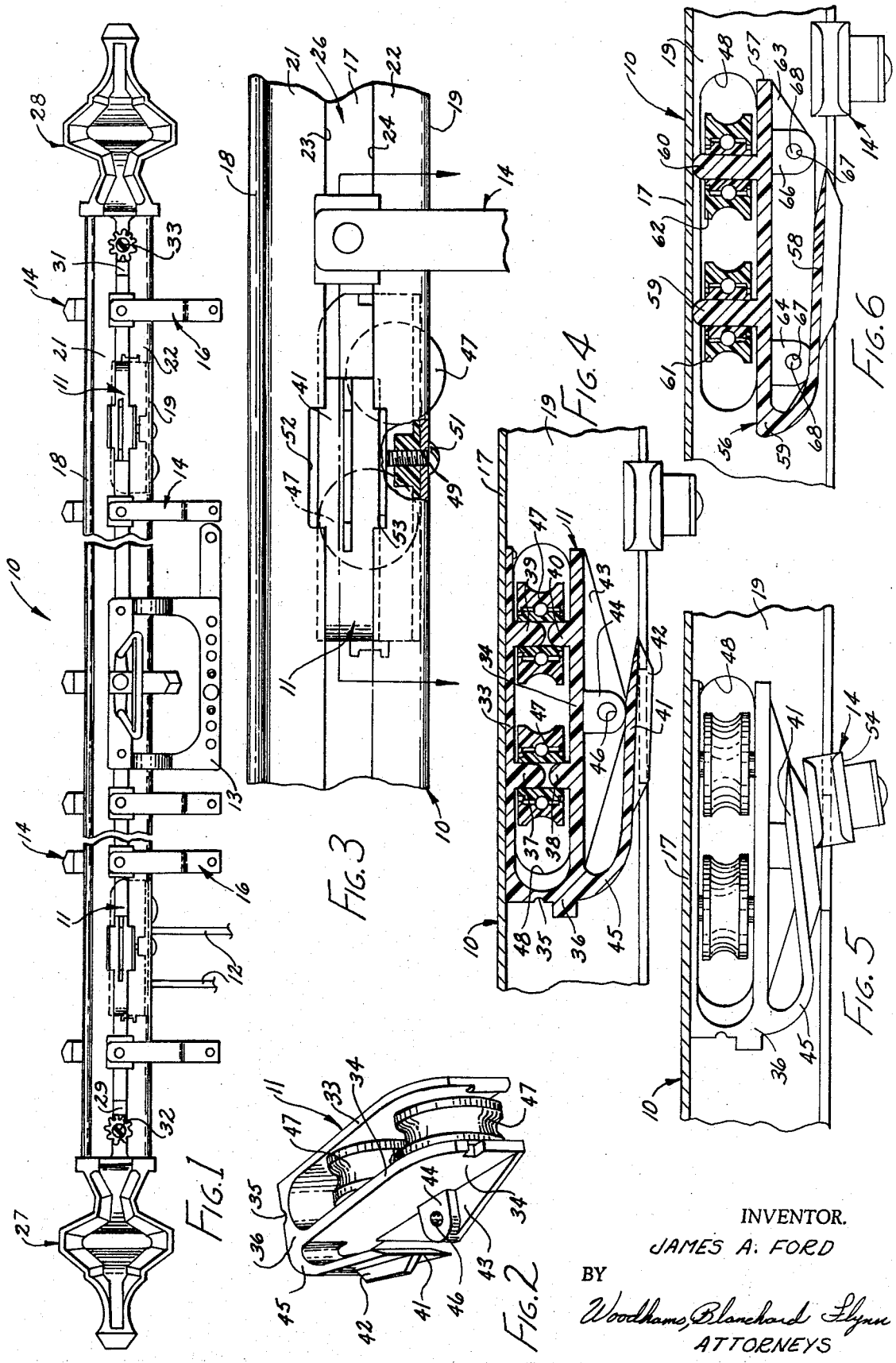

3,521,317
UNITARY PULLEY HOUSING
James A. Ford, Sturgis, Mich., assignor to Kirsch Company, Sturgis, Mich., a corporation of Michigan
Filed Feb. 27, 1968, Ser. No. 709,596
Int. Cl. A47h *15/00;* E05d *13/02*
U.S. Cl. 16—93                                        5 Claims

ABSTRACT OF THE DISCLOSURE

A molded plastic pulley housing securable inside a traverse rod and spaced from the ends thereof, said housing having first, second and third parallel walls of which the first and third walls are resiliently flexible out of parallel relationship with the second wall. The pulley housing includes pulley holding means secured to said second and third walls and rotatably support pulley members thereon.

FIELD OF THE INVENTION

This invention relates to an improvement in a pulley housing of a traverse rod and, more particularly, relates to an improvement over metallic, multiple piece pulley housing structures.

DESCRIPTION OF THE PRIOR ART

Previous pulley housings have been constructed from a plurality of sheet metal components and are well known. These are, however, relatively expensive to manufacture for several reasons. One source of expense lies in the time required to assemble the many components. Another lies in the provision of, and the precise interfitting of, tabs and openings between the traverse rod and the pulley housing such tabs and corresponding openings complicating both manufacturing of the components and their assembly.

Further, the use of such metal pulley housing is a source of inconvenience, and possible expense, in that removal of the pulley housing from the track, such as for repair, is often difficult due to the frequent necessity of bending the tabs outwardly sufficiently to release the pulley housing for movement axially of the rod. More particularly, it is often difficult to insert a tool into the interior of the traverse rod to release the tabs.

In addition, in known pulley housing structures, it is often difficult to replace the pulley members within a given housing in view of the fact that their axles are usually permanently riveted to the sidewalls of the structure. In order to remove the pulleys, for example, for repair purposes, it would be necessary to deform the head of the rivet in order to withdraw it from the pulleys and the pulley housing. Such an endeavor is time consuming and expensive thus making it usually more economical to replace the entire pulley housing rather than replacing a faulty pulley.

Accordingly, the objects of this invention have been:
(1) To provide a pulley housing having a unitary molded plastic construction.
(2) To provide a pulley housing, as aforesaid, wherein the pulley members may be easily installed therein as well as easily removable therefrom.
(3) To further provide a pulley housing, as aforesaid, which is easy to manufacture using commonly known manufacturing techniques.
(4) To further provide a pulley housing, as aforesaid, which is inexpensive to manufacture and assemble.
(5) To further provide a pulley housing, as aforesaid, which is simple to install into a traverse rod and requires a minimum of tooling by the assembler.
(6) To further provide a pulley housing, as aforesaid, which simplifies the design of the traverse rod and, accordingly, reduces the manufacturing expense of the traverse rod.

Other objects and purposes of this invention will be apparent to persons acquainted with traverse rods and pulley housings of this general type upon reading the following specification and inspecting the accompanying drawings.

BRIEF DESCRIPTION OF THE DRAWINGS

FIG. 1 is a fragmentary rear elevational view of a traverse rod embodying the invention.
FIG. 2 is a perspective view of a pulley housing embodying the invention.
FIG. 3 is an enlarged fragmentary rear elevational view of the traverse rod illustrated in FIG. 1.
FIG. 4 is a sectional view taken along the line IV—IV of FIG. 3.
FIG. 5 is a sectional view taken along the line V—V of FIG. 3.
FIG. 6 is a sectional view of a modified construction.

Certain terminology will be used in the following description for convenience and reference only and will not be limiting. The words "upwardly," "downwardly," "rightwardly" and "leftwardly" will designate directions in the drawings to which reference is made. The words "front" and "rear" will designate the particular orientation of the rod, the "rear" side of the rod being illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

In general, the objects and purposes of the invention have been met by providing a unitary molded plastic pulley housing frame having at least a pair of normally parallel walls, at least one wall of which is resiliently flexible out of parallel relationship with the other wall, and pulley holding means secured to the other of said walls and releasably supporting pulley members thereon.

DETAILED DESCRIPTION

The traverse rod illustrated in FIG. 1 in general includes an elongated rod 10 which is supported in any convenient manner, not shown. Pulley housing assemblies 11 are mounted inside the rod 10 and have a traverse cord 12 threaded thereover and connected to a master slide 13 for moving the same along the rod.

In the embodiment shown, only one master slide 13 is illustrated, as is suitable for one way traverse operation, it being undesrtood that a pair of master slides can be provided and connected to the traverse cord 12 for movement in relatively opposite directions toward and away from the center of the rod in a manner well known in the art for a two-way operation. A plurality of auxiliary slides 14 are mounted in the rod and have drapery support pendants 16 for supporting the draper thereon.

The rod 10 may be formed in any suitable way such as by rolling a strip of stock into the desired shape or by extrusion so that said rod 10 has a front wall 17, a top wall 18, a bottom wall 19 and upper and lower rear walls 21 and 22 having spaced-apart edges 23 and 24 defining a slot 26 therebetween and which extends lengthwise of the rod.

The decorative finials 27 and 28, if used, may have portions 29 and 31, respectively, which project into the interior of the rod 10, and are fastened in any convenient manner, as by a screw 32 and washer 33.

The pulley housing 11 (FIG. 2) comprises a W-shaped molded plastic frame having parallel and spaced front and rear walls 33 and 34, respectively, which are integrally joined together by a bight or web portion 36 at the left end thereof (FIG. 4). The opposing faces of the parallel walls 33 and 34 each have a pair of axially aligned projections 37, 38 and 39, 40 extending inwardly toward each other but are spaced from each other at the inner ends thereof. In this particular embodiment, the projections 37 and 39 are slightly longer than the projections 38 and 40.

The thickness of the web portion 36 is sufficient to define a solid base for said front and rear walls and yet permit a relatively flexible movement of the wall 33 into and out of parallel relationship with the wall 34 so as to vary the spacing between the projections 37, 38 and 39, 40. A notch 35 is provided in a surface of the bight 36 to facilitate an easier flexing of the wall 33 without affecting the wall 34.

A flange 43 is integrally secured to the lower rear surface of the wall 34 and projects perpendicularly away therefrom. A raised boss 44 extends upwardly from the upper surface of the flange 43 and has an opening 46 extending therethrough.

An arm 41 is integrally secured to the bight or web portion 36 of the pulley housing 11 and extends substantially parallel to the walls 33 and 34 but horizontally spaced therefrom. The thickness of the web portion 36 is sufficient to define a solid base for said arm and yet permitting a relatively flexible movement of the arm 41 into and out of parallel relationship with the wall 34.

In this embodiment, the leftward end of arm 41 projects perpendicularly rearwardly from the thick bight or web 36 and wall 34 and is curved as at 45 and then extends along the wall 34 though slightly out of parallel alignment with the wall 34 when in an unassembled condition as illustrated in FIG. 2. The arm 41 is thinner than the bight and can be flexed relative to the wall 34 without affecting the wall 34.

A flange 42 projects outwardly from the central rear surface of the arm 41 and serves as a tab on which an operator can apply pressure to move the arm 41 toward the wall 34.

Pulley members 47 of any conventional type having central openings therein are rotatably supported on the projections 37, 38 and 39, 40.

An elongated opening or slot 48 (FIG. 4) is located in the bottom wall 19 of the traverse rod 10 and is positioned closely adjacent the front wall 17. An opening 49 (FIG. 3) is located in the bottom wall 19 of the traverse rod 10 between the slot 48 and the lower rear wall 22. The pulley housing 11 is mounted on the inside of the rod 10 and is positioned so that the pulley members 47 are located above the slot 48 and the opening 46 (FIG. 2) is axially aligned with the opening 49. A self-threading screw 51 is received through the openings 46 and 49 to anchor the pulley housing 11 to the rod 10. It is recognized of course, that more than one fastening member may be utilized to anchor the pulley housing to the rod. However, in this particular embodiment, only one such fastening member 51 is required due to the fact that the front wall 33 of the pulley housing engages the inner surface of the front wall 17 of the traverse rod 10. Thus, the pulley housing 11 will not pivot about the axis of the screw 51.

It is sometimes necessary to remove slides 14 from the slot 26 dependent upon the length of the drapery and the number of pleats in the drapery. In order to facilitate insertion and removal of the slides from the rod, the arm 41 is aligned with at least one and preferably two vertically aligned notches 52 and 53 in the edges 23 and 24 of the upper and lower rear walls 21 and 22, respectively, so that the width of the slot 26 is increased at this particular point in the length of the rod. The notches intersect the slot 26 and have a length and width to provide an opening in the slot larger than the head portion 54 of the slides 14 to permit lateral insertion and removal of the slide body from the slot intermediate the ends of the rod. The flange 42 on the arm 41 is also aligned with the notches 52 and 53 and project slightly outwardly of the rear walls 21 and 22.

MODIFIED CONSTRUCTION

The structure illustrated in FIG. 6 is a modification over the embodiment shown in FIGS. 1–5. A unitary U-shaped frame 56 comprising a first wall 57 and a second wall 58. The first wall 57 has a pair of frontwardly extending projections 59 and 60 thereon which rotatably support pulleys 61 and 62. A flange 63 is integrally secured to the lower rear surface of the wall 57 and projects perpendicularly away therefrom. A pair of raised bosses 64 and 66 extend upwardly from the upper surface of the flange 63 and each has an opening 67 extending therethrough which receive self-threading screws 68 which secure the frame 56 to the rod 10.

The wall 58 is integrally secured to the front wall 57 through a bight or web 59 which has a thickness sufficient to define a solid base for said wall 58 thereby permitting a relatively flexible movement of the wall 58 into and out of parallel relationship with the wall 57.

The pulleys, in this embodiment, are releasably securable to the projections 59 and 60 in any well-known and conventional manner.

OPERATION

The operation of the device embodying the invention has been indicated somewhat above, but will be described in detail hereinbelow for a better understanding of the invention.

In assembling the pulley housing 11, the wall 33 may be moved out of parallel relationship with the wall 34 so that the spacing between the ends of the projections 37, 38 and 39, 40 are increased sufficiently so that the pulley members 47 can be inserted thereon. Due to the resiliency of the arm 33, it will move back into parallelism with the wall 34 so as to cause the pulleys 47 to become rotatably supported on the aforesaid projections. Removal of the pulleys is effected equally simply by reversing the procedure.

When the pulley housing has been assembled into the rod 10, sliders 14 may be added to the rod 10 through the notches 52 and 53 by moving the arm 41 inwardly as illustrated in FIG. 5. Likewise, slider members 14 may be removed from the track 10 by the operator depressing the tab 42 inwardly of the rod so that a slider element 14 may move axially of the rod into alignment with the notches 52 and 53.

Thus, the simple design of the pulley housing necessitates only an inexpensive construction and assembly since only three components are utilized. Namely the unitary frame construction and the two pulleys which are releasably secured thereto. Thus, the assembly time is considerably lessened over that known in the prior art resulting in a more inexpensive pulley housing and in turn, a less expensive traverse rod construction to manufacture.

Although particular preferred embodiments of the invention have been disclosed above for illustrative purposes, it will be understood that variations or modifications of the disclosed apparatus, including the rearrangement of parts, lie within the scope of the present invention.

The embodiments of the invention in which an exclusive property or privilege is claimed are defined as follows:

1. A pulley housing, comprising:
   a unitary frame having first and second substantially parallel wall means, said first and second wall means having an enlarged section therebetween so that said first wall means is capable of a limited flexing without affecting said second wall means;
   third wall means substantially parallel with said second wall means and interconnected to said second wall means adjacent an end by second integral bight means having a notch therein thereby permitting a limited flexible movement of said third wall means relative to said second wall means;

cord guide means secured to said second and third wall means, said cord guide means including integral projection means extending inwardly of opposing faces of said second and third walls, pulley means being rotatably supported on said integral projection means, said pulley means being releasably secured to said projection means whereby a flexing of said third wall away from said second wall will release said pulley means;

an elongated and hollow traverse rod having lengthwise wall portions with adjacent edges thereof spaced apart to define a slot therebetween, a plurality of slides each including a body slideably received in said slot and having a head portion inside the traverse rod larger than said slot to normally retain said body therein, said slides each having means outside said rod for attaching a drapery thereto, at least one of said lengthwise wall portions having a notch therein inwardly of the ends of said rod, said notch intersecting said slot and having a length and width providing an opening in said slot larger than said head portion of said slide to enable lateral insertion and removal of said slide body from said slot; and said unitary pulley housing being mounted on said rod inwardly of the ends thereof and including means securing said unitary frame to said rod and said first wall adjacent and normally covering said notch.

2. A one-piece moldable plastic pulley housing, comprising:

a unitary moldable plastic frame having first and second substantially parallel wall means;

cord guide means secured to said second wall means;

said first and second wall means having an enlarged integrally moldable plastic section therebetween so that said first wall means is capable of a limited flexing without affecting said second wall means;

an elonagted and hollow traverse rod having lengthwise wall portions with adjacent edges thereof spaced apart to define a slot therebetween, a plurality of slides each including a body slideably received in said slot and having a head portion inside the traverse rod larger than said slot to normally retain said body therein, said slides each having means outside said rod for attaching a drapery thereto, at least one of said lengthwise wall portions having a notch therein inwardly of the ends of said rod, said notch intersecting said slot and having a length and width providing an opening in said slot larger than said head portion of said slides to enable lateral insertion and removal of said slide body from said slot;

said one-piece moldable plastic pulley housing being mounted internally of said rod inwardly of the ends thereof adjacent said notch and including means securing said frame to said rod, said first wall being laterally spaced from said securing means a distance slightly greater than the lateral spacing between said securing means and said lengthwise wall portions and said slot so that said first wall will resiliently engage said lengthwise walls to block said notch to prevent the passage of said slides through said notch, said limited flexing of said first wall permitting a movement of said first wall away from said notch to permit a removal of said slides through said notch.

3. The pulley housing defined in claim 2, wherein said cord guide means include integral projection means on said second wall and pulley means rotatably supported thereon.

4. The pulley housing defined in claim 2, including integral moldable plastic third wall means substantially parallel with said second wall means and interconnected to said second wall means adjacent an end by second integrally moldable plastic bight means having a notch therein thereby permitting a limited flexible movement of said third wall means relative to said second wall means; and wherein said cord guide means are secured to said second and third wall means.

5. A one-piece moldable plastic pulley housing, comprising:

a unitary moldable plastic frame having first and second substantially parallel wall means;

cord guide means including integral projection means extending inwardly of opposing faces of said first and second walls and pulley means being rotatably supported thereon;

said first and second wall means having an enlarged integrally moldable plastic section therebetween, said enlarged integrally moldable plastic section having a notch therein thereby permitting a limited relative flexing movement of said second wall means; and said pulley means being releasably secured to said projection means whereby a flexing of said second wall away from said first wall will release said pulley means.

References Cited

UNITED STATES PATENTS

| | | | |
|---|---|---|---|
| 3,049,176 | 8/1962 | Graber et al. | 160—346 |
| 3,155,148 | 11/1964 | Kenney | 160—344 |
| 3,192,996 | 7/1965 | Greenstadt et al. | 160—345 |
| 3,337,903 | 8/1967 | Kenney | 16—87.4 |

CASMIR A. NUNBERG, Primary Examiner

U.S. Cl. X.R.

160—346